United States Patent
Higuchi et al.

(10) Patent No.: US 10,865,257 B2
(45) Date of Patent: Dec. 15, 2020

(54) PRODUCTION METHODS FOR AQUEOUS EMULSION, FINE POWDER AND STRETCHED POROUS BODY OF MODIFIED POLYTETRAFLUOROETHYLENE

(71) Applicant: AGC Inc., Chiyoda-ku (JP)

(72) Inventors: Shinya Higuchi, Chiyoda-ku (JP); Hiroki Nagai, Chiyoda-ku (JP); Shigeki Kobayashi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 227 days.

(21) Appl. No.: 15/875,427

(22) Filed: Jan. 19, 2018

(65) Prior Publication Data

US 2018/0142043 A1    May 24, 2018

Related U.S. Application Data

(63) Continuation of application No. PCT/JP2016/073776, filed on Aug. 12, 2016.

(30) Foreign Application Priority Data

Aug. 19, 2015  (JP) ................................. 2015-162239

(51) Int. Cl.
| | | |
|---|---|---|
| *C08F 214/26* | (2006.01) | |
| *C08F 14/26* | (2006.01) | |
| *C08F 6/22* | (2006.01) | |
| *C08F 2/26* | (2006.01) | |
| *C08J 3/16* | (2006.01) | |
| *B29C 48/285* | (2019.01) | |
| *B29C 48/00* | (2019.01) | |
| *B29C 48/08* | (2019.01) | |
| *B29C 55/00* | (2006.01) | |
| *B29K 27/18* | (2006.01) | |
| *B29C 48/92* | (2019.01) | |
| *B29K 105/04* | (2006.01) | |
| *B29C 48/02* | (2019.01) | |

(52) U.S. Cl.
CPC .............. *C08F 2/26* (2013.01); *B29C 48/288* (2019.02); *C08F 6/22* (2013.01); *C08F 14/26* (2013.01); *C08F 214/26* (2013.01); *C08J 3/16* (2013.01); *B29C 48/0018* (2019.02); *B29C 48/02* (2019.02); *B29C 48/08* (2019.02); *B29C 48/92* (2019.02); *B29C 55/005* (2013.01); *B29C 2948/92019* (2019.02); *B29K 2027/18* (2013.01); *B29K 2105/04* (2013.01); *C08J 2427/18* (2013.01)

(58) Field of Classification Search
CPC .... C08F 2/26; C08F 6/22; C08F 14/26; C08F 214/26; C08J 3/16
USPC ......................................................... 524/544
See application file for complete search history.

(56) References Cited

U.S. PATENT DOCUMENTS

| | | |
|---|---|---|
| 2003/0073796 A1 | 4/2003 | Baillie |
| 2007/0010642 A1 | 1/2007 | Sabol et al. |
| 2008/0214714 A1 | 9/2008 | Hoshikawa et al. |
| 2011/0040054 A1 | 2/2011 | Higuchi et al. |
| 2012/0028046 A1* | 2/2012 | Ono .......................... C08F 2/26 428/402 |
| 2015/0322237 A1 | 11/2015 | Nanba |

FOREIGN PATENT DOCUMENTS

| | | |
|---|---|---|
| JP | 2005-506405 | 3/2005 |
| JP | 2009-500491 | 1/2009 |
| WO | WO 2007/046482 A1 | 4/2007 |
| WO | WO 2009/142080 A1 | 11/2009 |
| WO | WO 2010/113950 A1 | 10/2010 |
| WO | WO 2011/055824 A1 | 5/2011 |
| WO | WO 2013/027850 A1 | 2/2013 |
| WO | WO 2014/084399 A1 | 6/2014 |
| WO | WO 2015/080292 A1 | 6/2015 |

* cited by examiner

Primary Examiner — Kelechi C Egwim

(74) Attorney, Agent, or Firm — Oblon, McClelland, Maier & Neustadt, L.L.P.

(57) ABSTRACT

To provide a production method for an aqueous emulsion of modified polytetrafluoroethylene which is environmentally friendly and which is suitable for producing a stretched porous body having excellent breaking strength. A production method for an aqueous emulsion of modified polytetrafluoroethylene, which is a method to obtain an aqueous emulsion of modified polytetrafluoroethylene particles having an average primary particle diameter of from 0.10 to 0.30 μm, by subjecting tetrafluoroethylene and a perfluoroalkyl ethylene to emulsion polymerization in an aqueous medium, using a polymerization initiator, in the presence of a fluorinated anionic surfactant having a LogPOW of from 2.4 to 3.4, wherein the amount of the perfluoroalkyl ethylene to be used, is from 120 to 3,000 ppm to the final production amount of the modified polytetrafluoroethylene; at the initiation of the emulsion polymerization, the entire amount of the perfluoroalkyl ethylene is permitted to be present, and, as the polymerization initiator, either one or both of a combination of a bromate and a bisulfite or sulfite, and a combination of a permanganate and oxalic acid, are used.

10 Claims, No Drawings

PRODUCTION METHODS FOR AQUEOUS EMULSION, FINE POWDER AND STRETCHED POROUS BODY OF MODIFIED POLYTETRAFLUOROETHYLENE

TECHNICAL FIELD

The present invention relates to a production method for an aqueous emulsion of modified polytetrafluoroethylene, a production method for a fine powder of modified polytetrafluoroethylene, and a production method for a stretched porous body of modified polytetrafluoroethylene.

BACKGROUND ART

Polytetrafluoroethylene (hereinafter referred to as PTFE) has been produced as a homopolymer of tetrafluoroethylene (hereinafter referred to as TFE), or optionally as a modified polytetrafluoroethylene (hereinafter referred to as a modified PTFE) i.e. a copolymer of tetrafluoroethylene with a small amount of a comonomer, and it has been applied to various uses.

For the production of PTFE, a method of subjecting TFE to emulsion polymerization in an aqueous medium in the presence of a fluorinated surfactant, or a method of subjecting TFE to suspension polymerization, is, for example, employed. In the emulsion polymerization method, an aqueous emulsion in which PTFE particles are emulsified and dispersed, is obtained. By coagulating the PTFE particles in the aqueous emulsion, followed by drying, a PTFE fine powder is obtained.

PTFE has a high melt viscosity and thus cannot be molded by a melt molding method such as an extrusion molding which is commonly applied to thermoplastic resins. Therefore, as a molding method of PTFE, a paste extrusion molding method is employed, which is a method of mixing a lubricant to a fine powder of PTFE, followed by extrusion molding.

Important products obtainable from a PTFE fine powder include clothes, tents, industrial precision filters, separation films, etc. For these products, a stretched porous body obtainable by the paste extrusion molding method is used, and in order to improve the product properties, it is desired to develop a stretched porous body excellent in breaking strength.

Heretofore, as a fluorinated surfactant to be used in the emulsion polymerization of TFE, ammonium perfluorooctanoate ($CF_3(CF_2)_6COONH_4$, hereinafter referred to also as APFO) having 8 carbon atoms, has been used. However, APFO does not exist in nature and is a material hardly decomposable, and further, it has been found highly bioaccumulative. In this background, a study has been made for a surfactant having a low bioaccumulation property.

Patent Documents 1 and 2 disclose examples wherein a modified PTFE was produced by emulsion polymerization, and by using this, a stretched porous body of modified PTFE having high breaking strength was produced, but as a fluorinated surfactant, APFO was used, such being not environmentally friendly technology.

Specifically, Patent Document 1 discloses a method of conducting emulsion polymerization by using a relatively large amount of perfluorobutyl ethylene as a comonomer, and using potassium permanganate as a polymerization initiator. Patent Document 2 discloses a method of conducting emulsion polymerization by using, as a comonomer, a perfluoroalkyl ethylene having a number of carbon atoms of from 6 to 10 in the perfluoroalkyl group, and using potassium permanganate as a polymerization initiator.

Patent Documents 3 and 4 relate to a technique in the case of using a fluorinated surfactant to replace APFO in consideration of the environmental effect.

Patent Document 3 discloses that it is possible to produce a highly heat resistant stretched porous body by conducting emulsion polymerization by using, as a fluorinated surfactant, a fluorinated carboxylic acid having an etheric oxygen atom in the main chain, and using a comonomer highly reactive with TFE, in a very small amount (from 0.001 to 0.01 mass %) relative to the production amount of the final modified PTFE. In its Comparative Example 2, an example is disclosed wherein bis-succinic acid peroxide and ammonium sulfite were used as polymerization initiators, and perfluorobutyl ethylene was used in an amount of 0.013 mass % (130 ppm), and it is shown that if the amount of perfluorobutyl ethylene is large, the heat resistance will be low.

Patent Document 4 discloses that it is possible to obtain a modified PTFE aqueous emulsion excellent in dispersion stability, by conducting emulsion polymerization by using perfluorohexanoic acid as a fluorinated surfactant, and using a comonomer having high reactivity with TFE, in a very small amount (e.g. 60 ppm) relative to the production amount of the final modified PTFE.

PRIOR ART DOCUMENTS

Patent Documents

Patent Document 1: JP-A-2005-506405
Patent Document 2: JP-A-2009-500491
Patent Document 3: WO 2011/055824
Patent Document 4: WO 2013/027850

DISCLOSURE OF INVENTION

Technical Problem

Heretofore, there has been no proposal for a technique to obtain a stretched porous body excellent in breaking strength by using a fluorinated surfactant to replace APFO in consideration of the environmental effect.

The present invention is, while paying attention to the environmental effect, to provide a production method for an aqueous emulsion of modified PTFE suitable for producing a stretched porous body excellent in breaking strength, a production method for a fine powder of modified PTFE, and a production method of a stretched porous body of modified PTFE.

Solution to Problem

The present invention provides the following production methods for an aqueous emulsion, fine powder and stretched porous body of modified polytetrafluoroethylene.

[1] A production method for an aqueous emulsion of modified PTFE, which is a method to obtain an aqueous emulsion of non-melt-moldable modified PTFE particles having an average primary particle diameter of from 0.10 to 0.30 μm, by subjecting TFE and a perfluoroalkyl ethylene represented by the following formula (1) to emulsion polymerization in an aqueous medium, using a polymerization initiator, in the presence of a fluorinated anionic surfactant having a LogPOW of from 2.4 to 3.4, and which is characterized in that the amount of the perfluoroalkyl ethylene to be used, is from 120 to 3,000 ppm (by mass) to the final production amount of the modified polytetrafluoroethylene, at the initiation of the emulsion polymerization, the entire amount of the perfluoroalkyl ethylene is permitted to be present, and as the polymerization initiator, either one or both of a combination of a bromate and a bisulfite or sulfite, and a combination of a permanganate and oxalic acid, are used:

$$CH_2=CH-Rf \quad (1)$$

(Rf is a $C_{1-6}$ perfluoroalkyl group).

[2] The production method for an aqueous emulsion of modified PTFE according to [1], wherein the fluorinated anionic surfactant is a fluorinated surfactant having 6 or 7 carbon atoms, 0 or 1 hydrogen atom, 0 or from 1 to 4 etheric oxygen atoms, a group represented by —COOA (A is H, $NH_4$ or an alkali metal atom) and the rest of atoms being fluorine atoms.

[3] The production method for an aqueous emulsion of modified PTFE according to [1] or [2], wherein the perfluoroalkyl ethylene is $CH_2=CH(CF_2)_2F$, $CH_2=CH(CF_2)_4F$ or $CH_2=CH(CF_2)_6F$.

[4] The production method for an aqueous emulsion of modified PTFE according to any one of [1] to [3], wherein the fluorinated anionic surfactant is used in an amount of from 0.2 to 2 mass % to the final production amount of the modified PTFE.

[5] A production method for a fine powder of modified PTFE, which comprises producing an aqueous emulsion of modified PTFE particles by the method as defined in any one of [1] to [4], coagulating the obtained aqueous emulsion, and drying the obtained wet state fine powder of modified PTFE, to obtain a powder having a standard specific gravity of from 2.130 to 2.145.

[6] The production method for a fine powder of modified PTFE according to [5], wherein the drying of the wet state fine powder of modified PTFE is carried out in an atmosphere containing ammonia.

[7] The production method for a fine powder of modified PTFE according to [5] or [6], wherein the standard specific gravity is from 2.135 to 2.142.

[8] The production method for a fine powder of modified PTFE according to any one of [5] to [7], wherein the extrusion pressure in the following extrusion test of the fine powder of modified PTFE is from 19 to 25 MPa:

Extrusion test: 100 g of the fine powder of modified PTFE left to stand for at least 2 hours at room temperature is put into a glass bottle having an internal capacity of 500 mL, and 21.7 g of a lubricating oil (Isopar H (registered trademark), manufactured by Exxon) is added and mixed for 3 minutes to obtain a mixture; and the obtained mixture is left to stand for 2 hours in a thermostat bath at 25° C. and then, subjected to paste extrusion through an orifice having a diameter of 2.5 cm, a land length of 1.1 cm and an introduction angle 30°, at 25° C. under conditions of a reduction ratio (ratio of the cross-sectional area of the inlet to the cross-sectional area of the outlet of a die) of 100 and an extrusion speed of 51 cm/min., to obtain an extruded bead, whereby the pressure required for the extrusion is measured, and the measured value is adopted as the extrusion pressure (unit: MPa).

[9] A production method for a stretched porous body of modified PTFE, which comprises producing a fine powder of modified PTFE by the method as defined in any one of [5] to [8], subjecting the obtained fine powder of modified PTFE to paste extrusion to obtain an extruded bead, and stretching the extruded bead.

[10] The production method for a stretched porous body of modified PTFE according to [9], wherein the breaking strength of the stretched porous body of modified PTFE is from 36 to 60N.

Advantageous Effects of Invention

According to the production methods of the present invention, in consideration of the environmental effect, it is possible to produce an aqueous emulsion of modified PTFE, a fine powder of modified PTFE and a stretched porous body of modified PTFE, by using a fluorinated anionic surfactant having a lower bioaccumulation property as compared to APFO, and it is possible to obtain a stretched porous body of modified PTFE excellent in breaking strength.

DESCRIPTION OF EMBODIMENTS

In the present invention, the following terms have the following meanings.

An "average primary particle diameter" means a median diameter based on volume measured by the laser scattering method particle size distribution analyzer.

A "standard specific gravity (hereinafter referred to also as SSG)" is an index for the molecular weight, and the larger this value, the smaller the molecular weight. Measurement conditions will be described later.

An "extrusion pressure" means a pressure required for paste extrusion in an extrusion test wherein one having a fine powder of modified PTFE prepared into a paste form under a predetermined condition, is extrusion-molded under a predetermined condition. Measurement conditions will be described later.

A "stability retention time" is a value measured by the stability test as described later, and it is, roughly, a time required for the emulsified state of an aqueous emulsion to be broken when a shearing force is exerted by using a container and stirring blade under predetermined conditions. The longer the stability retention time, the better the stability of the aqueous emulsion.

A "modified PTFE" is a copolymer of tetrafluoroethylene and a very small amount of a comonomer, and means a non-melt-moldable copolymer. The content of units derived from the comonomer in a modified PTFE is generally less than 0.5 mass %, preferably less than 0.25 mass %, more preferably less than 0.18 mass %. In the present invention, the content of units derived from PFAE as a comonomer is in the specific range as described later.

The "non-melt-moldable" is meant to be unable to be melt-molded, i.e. to show no melt flowability. Specifically, it means that the melt flow rate measured at a measuring temperature of 372° C. under a load of 49N in accordance with ASTM D3307, is less than 0.5 g/10 min.

The "final production amount of the modified PTFE" can be estimated to be substantially equal to the amount of TFE consumed in the polymerization reaction step.

The production method for an aqueous emulsion of modified PTFE of the present invention, has a step of subjecting tetrafluoroethylene and a perfluoroalkyl ethylene to emulsion polymerization in an aqueous medium, using a polymerization initiator, in the presence of a fluorinated anionic surfactant, to obtain an aqueous emulsion of modified PTFE particles.

<Perfluoroalkyl Ethylene>

In the present invention, a perfluoroalkyl ethylene (hereinafter referred to also as PFAE) represented by $CH_2=CH-Rf$, is used as a comonomer. Rf is a $C_{1-6}$ perfluoroalkyl group.

In the case of a compound wherein the number of carbon atoms in Rf is 7 or more, its decomposition product is considered to be likely to include a compound similar to APFO which is an environmentally concerned substance, and therefore, it is environmentally preferred that the number of carbon atoms in Rf is at most 6.

Further, the present inventors have confirmed by a method such as a scanning electron microscopic measurement, that by using PFAE as a comonomer, the average primary particle diameter of modified PTFE formed by the emulsion polymerization will be smaller and more uniformly aligned, than a case where no comonomer is used.

The number of carbon atoms in Rf is more preferably from 2 to 6. In particular, $CH_2=CH-(CF_2)_2F$, $CH_2=CH-(CF_2)_4F$ (perfluorobutyl ethylene, hereinafter referred to also as PFBE), or $CH_2=CH-(CF_2)_6F$ (perfluorohexyl ethylene, hereinafter referred to also as PFHE), is preferred. Two or more types of PFAE may be used in combination.

The amount of PFAE is from 120 to 3,000 ppm (from 0.012 to 0.300 mass %), preferably from 120 to 2,500 ppm, more preferably from 150 to 2,500 ppm, most preferably from 200 to 2,500 ppm, relative to the final production amount of the modified PTFE. Within the above range, a sufficient improvement effect in breaking strength of the stretched porous body can be easily attained. Within this range, all PFAE used will be copolymerized with TFE, whereby the content of units derived from PFAE in the modified PTFE will be equal to the amount used.

<Fluorinated Anionic Surfactant>

In the present invention, a fluorinated anionic surfactant having a LogPOW of from 2.4 to 3.4 is used. The LogPOW is a distribution coefficient in 1-octanol and water as stipulated in OECD Test Guideline 107, 117 and Japanese Industrial Standard Z7260-107 (2000).

At the time when a mixed liquid of octanol/water (1:1) each containing a surfactant to be measured, is phase-separated, POW represents a ratio of the surfactant concentration in octanol/the surfactant concentration in water. A surfactant having a large distribution coefficient value has a high bioaccumulation property, and a surfactant having a small distribution coefficient value has a low bioaccumulation property. When the LogPOW is 3.4 or less, the bioaccumulation property is judged to be low. By the measurement conducted by the present inventors, the LogPOW of APFO was 3.67.

Further, when the LogPOW is at least 2.4, the stability of the aqueous emulsion of modified PTFE can be maintained well during polymerization. The LogPOW is preferably from 2.4 to 3.3, more preferably from 2.5 to 3.3, most preferably from 2.5 to 3.2.

As a fluorinated anionic surfactant having a LogPOW of from 2.4 to 3.4, preferred is a fluorinated surfactant having 6 or 7 carbon atoms, 0 or 1 hydrogen atom, 0 or from 1 to 4 etheric oxygen atoms, a group represented by —COOA (A is H, $NH_4$ or an alkali metal atom) and the rest of atoms being fluorine atoms.

As specific examples of the fluorinated anionic surfactant having a LogPOW of from 2.4 to 3.4, one or more members selected from the group consisting of
$CF_3OCF(CF_3)CF_2OCF(CF_3)COOA$,
$CF_3CF_2OCF_2CF_2OCF_2COOA$,
$CF_3OCF_2CF_2CF_2OCHFCF_2COOA$,
$C_3F_7OCF(CF_3)COOA$,
$H(CF_2)_3COOA$,
$CF_3CF_2(CF_2CF_2)_2COOA$,
$CF_3(CF_2CF_2)_2COOA$,
and a compound represented by the following formula (2) are preferred. A is H, $NH_4$ or an alkali metal atom (preferably Na or K).

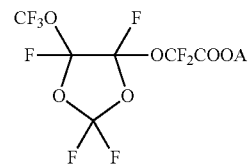

(2)

Among these fluorinated anionic surfactants, particularly from the viewpoint of excellent stability of the aqueous emulsion of modified PTFE during polymerization, and a low bioaccumulation property, $CF_3CF_2OCF_2CF_2OCF_2COOA$, $CF_3OCF_2CF_2CF_2OCHFCF_2COOA$ or a compound of formula (2) is preferred, $CF_3CF_2OCF_2CF_2OCF_2COOA$ is more preferred. Particularly, the fluorinated anionic surfactant wherein A is $NH_4$ is most preferred.

The amount of the fluorinated anionic surfactant to be present, is preferably from 0.2 to 2 mass %, more preferably from 0.4 to 2 mass %, further preferably from 0.5 to 2 mass %, most preferably from 0.6 to 2 mass %, based on the final production amount of the modified PTFE.

When the amount of the fluorinated anionic surfactant to be present, is at most the upper limit value in the above range, the modified PTFE particles to be formed are less likely to become a rod-shape, and it will be easy to obtain good stability of the aqueous emulsion. When it is at least the lower limit value in the above range, it will be easy to obtain good emulsion stability during polymerization, and it will be easy to prevent agglomeration of modified PTFE particles or formation of coagulum.

<Polymerization Initiator>

As the polymerization initiator in the present invention, either one or both of a combination of a bromate and a bisulfite or sulfite, and a combination of a permanganate and oxalic acid, may be used as a water-soluble redox initiator.

The water-soluble redox initiator is preferably used, as described below, by letting either the reducing agent or the oxidizing agent be present preliminarily in the polymerization reaction system, and then adding the other one continuously or intermittently to initiate the polymerization. For example, in the case of using a potassium permanganate/oxalic acid, it is preferred to charge oxalic acid to the polymerization vessel, and add the potassium permanganate thereto continuously or intermittently. In the case of using a bromate and a sulfite, it is preferred to charge the bromate preliminarily to the polymerization vessel, and then add the sulfite continuously or intermittently thereto.

The reducing agent or oxidizing agent permitted to be present preliminarily in the polymerization reaction system, is preferably from 0.01 to 0.50 mmol/L, more preferably from 0.03 to 0.35 mmol/L, to the volume (L) of the aqueous medium to be charged to the polymerization vessel. Within this range, it is easy to control the emulsion polymerization. Further, the amount of the reducing agent or oxidizing agent added to be present preliminarily in the polymerization reaction system, is preferably from 0.5 to 10 times in the theoretical amount in the oxidation-reduction reaction, to the other oxidizing agent or reducing agent to be subsequently added.

For example, in the case of preliminarily supplying oxalic acid and subsequently adding potassium permanganate, it is preferred that the amount of oxalic acid is from 0.04 to 0.20 mmol/L, and the amount of potassium permanganate is from 1/20 to 1/4 mol times thereof.

In a case of preliminarily supplying potassium bromate and subsequently adding ammonium sulfite, it is preferred that the amount of potassium bromate is from 0.03 to 0.20 mmol/L, and the amount of ammonium sulfite is from 3/10 to 1/1 mol times thereof.

<Stabilizing Aid>

For the emulsion polymerization of TFE, it is preferred to use a stabilizing aid. The stabilizing aid is preferably one which has sufficient hydrophobicity and which is readily separable and removable from the aqueous emulsion of modified PTFE after the emulsion polymerization.

As the stabilizing aid, paraffin wax, fluorinated oil, fluorinated solvent, silicone oil or the like is preferred. As the stabilizing aid, one type may be used alone, or two or more types may be used in combination.

Particularly, paraffin wax is preferred. Paraffin wax may be liquid, semi-solid or solid at room temperature, but is preferably a saturated hydrocarbon having at least 16 carbon atoms. The melting point of paraffin wax is usually preferably from 40 to 65° C., more preferably from 50 to 65° C.

The amount of the stabilizing aid to be used, is preferably from 0.1 to 12 mass %, more preferably from 0.1 to 8 mass %, relative to the aqueous medium to be used. When the amount is at least the lower limit value in the above range, it is easy to obtain good stability of the aqueous emulsion of modified PTFE during polymerization. If the stability of the aqueous emulsion of modified PTFE during polymerization is impaired, coagulum are likely to be formed in a large amount. When the amount is at most the above upper limit value, it will be easy to separate and remove the stabilizing aid after polymerization.

<Aqueous Medium>

The aqueous medium may, for example, be water, a mixture of water and a water-soluble organic solvent, etc.

The water-soluble organic solvent may, for example, be tert-butanol, propylene glycol, dipropylene glycol, dipropylene glycol monomethyl ether, tripropylene glycol, etc.

In a case where the aqueous medium contains a water-soluble organic solvent, the content of the water-soluble organic solvent is preferably from 1 to 40 parts by mass, more preferably from 3 to 30 parts by mass, to 100 parts by mass of water.

<Production Method for Aqueous Emulsion of Modified PTFE>

The production method for an aqueous emulsion of modified PTFE of the present invention, has a step of subjecting TFE and PFAE to emulsion polymerization in an aqueous medium, using a polymerization initiator, in the presence of a fluorinated anionic surfactant, to obtain an aqueous emulsion of modified PTFE.

Since the copolymerization reactivity of PFAE and TFE is high, it is preferred to let the entire amount of PFAE be present in the polymerization reaction system at the initiation of the emulsion polymerization. Specifically, it is preferred to charge the entire amount of PFAE to the polymerization reactor prior to supplying TFE.

Preferred is a method wherein in a polymerization reaction vessel, an aqueous medium, a fluorinated anionic surfactant, a stabilizing aid, PFAE and either one of the reducing agent or oxidizing agent of a water-soluble redox initiator, are charged, and then, the other of the reducing agent or oxidizing agent, and TFE, are supplied to initiate a polymerization reaction. TFE is preferably supplied continuously or intermittently to the polymerization reaction vessel.

During continuation of the polymerization reaction, it is preferred to conduct an operation to control formation of radicals from the water-soluble redox initiator in the polymerization reaction system. For example, in the case of adding an oxidizing agent or reducing agent during the polymerization reaction, an operation to stop the addition is carried out. Or, by controlling the supply amount of the reducing agent or oxidizing agent to be subsequently added, so that all of the oxidizing agent or reducing agent preliminarily added prior to initiation of the polymerization reaction will be completely consumed, it is possible to suppress formation of radicals in the course of the polymerization reaction.

Such an operation to suppress formation radicals is preferably carried out at a later stage of polymerization. The later stage of polymerization is a stage when the total amount of TFE added after initiation of the polymerization reaction becomes preferably at least 30 mass %, more preferably least 40 mass %, further preferably at least 50 mass %, most preferably at least 60 mass %, to the final production amount of the modified PTFE. It is considered that if formation of new radicals is suppressed during the polymerization, living polymerization by only radicals at polymer terminals of the modified PTFE will proceed thereafter, whereby it is possible to obtain a modified PTFE having a higher molecular weight.

The polymerization temperature is preferably from 10 to 95° C., more preferably from 15 to 90° C.

The polymerization pressure is preferably from 0.5 to 4.0 MPa, more preferably from 0.6 to 3.5 MPa. The polymerization time is preferably from 90 to 520 minutes, more preferably from 90 to 450 minutes.

As described above, an aqueous emulsion containing polymer particles (modified PTFE particles) formed by subjecting TFE to a polymerization reaction in the presence of PFAE is obtainable. In a case where a stabilizing aid is used, it is separated and removed by a conventional method to obtain an aqueous emulsion of modified PTFE.

<Aqueous Emulsion of Modified PTFE>

Particles present in the aqueous emulsion of modified PTFE are substantially modified PTFE particles.

Modified PTFE particles in the present invention are non-melt-moldable. PTFE is non-melt-moldable, and a modified PTFE wherein the amount of the comonomer used is in the above-mentioned range, is non-melt-moldable.

The average primary particle diameter of modified PTFE particles in the aqueous emulsion of modified PTFE is from 0.10 to 0.30 µm, preferably from 0.10 to 0.25 µm, more preferably from 0.14 to 0.22 µm, most preferably from 0.15 to 0.21 µm. When the average primary particle diameter is at least the lower limit value in the above range, coagulation becomes possible, whereby it will be easy to obtain a fine powder of modified PTFE, and when it is at most the upper limit value, it will be easy to obtain a uniformly stretched porous body.

By producing the modified PTFE by emulsion polymerization, it is possible to obtain modified PTFE particles having an average primary particle diameter within the above range.

The solid content concentration in the aqueous emulsion of modified PTFE is preferably from 10 to 45 mass %, more preferably from 15 to 45 mass %, further preferably from 20 to 40 mass %. When the solid content concentration is at least the lower limit value in the above range, the productivity will be excellent, and it will be easy to coagulate primary particles of the modified PTFE from the aqueous emulsion. When it is at most the upper limit value in the above range, it will be easy to obtain good stability of the aqueous emulsion.

The stability retention time of the aqueous emulsion of modified PTFE is preferably at least 200 seconds, more preferably at least 300 seconds, further preferably at least 400 seconds, particularly preferably at least 500 seconds. The upper limit is preferably at most 2,500 seconds, more preferably at most 2,000 seconds, most preferably at most 1,700 seconds. When the stability retention time is in the above range, such is within a range where the productivity of the fine powder of modified PTFE is acceptable.

The aqueous emulsion of modified PTFE is preferably used in the production of a fine powder of modified PTFE via the later-described coagulating step.

It is also preferred to produce an aqueous dispersion of modified PTFE by suitably blending a fluorinated nonionic surfactant, a non-fluorinated surfactant, a preservative, a viscosity modifier, etc. to the aqueous emulsion of modified PTFE itself or after concentrating it by a known concentrating method.

The obtained aqueous dispersion of modified PTFE is applicable to various applications, such as electronic materials such as printed circuit boards, roofing membrane structures, surface coating agents for cookwares; spinning material for producing fluoropolymer fibers such as PTFE fibers; dust prevention agents; active substance binder for batteries; plastic additives, etc.

<Production Method for Fine Powder of Modified PTFE>

The production method for a fine powder of modified PTFE of the present invention has a step of coagulating the aqueous emulsion of modified PTFE as obtained above to obtain a fine powder of modified PTFE in a wet state and drying the wet state fine powder of modified PTFE to obtain a powder having a standard specific gravity of from 2.130 to 2.145.

As the coagulation method, a known method may be employed. For example, it is possible to employ a method wherein the aqueous emulsion of modified PTFE is diluted with water so that the solid content concentration in the emulsion will be from 8 to 25 mass %, and then adjusted to a temperature of from 5 to 30° C., followed by vigorous stirring by stirring blades to coagulate primary particles of modified PTFE.

At the time of coagulating modified PTFE particles, as the case requires, the pH of the aqueous emulsion of modified PTFE may be adjusted, or a coagulation aid such as an electrolyte or a water-soluble organic solvent may be added to the aqueous emulsion of modified PTFE.

The pH adjusting agent may, for example, be sodium carbonate, sodium bicarbonate, etc. Further, it is also preferred to conduct coagulation in the presence of at least one member selected from the group consisting of ammonia, ammonium salts and urea.

The electrolyte may be an inorganic salt such as potassium nitrate, sodium nitrate, sodium carbonate, sodium bicarbonate, etc. The organic solvent may, for example, be an alcohol, acetone, etc.

After primary particles of modified PTFE are coagulated, while being moderately stirred, the fine powder of modified PTFE having the primary particles coagulated, will be separated. Thereafter, it is preferred to adjust the particle diameter of the fine powder of modified PTFE via a process of agglomeration or particle size regulation. Here, the agglomeration is a process wherein modified PTFE particles will grow to a level of a few 100 μm, and the particle size regulation is a process for regulating the particle properties or particle size distribution by continuing the stirring.

By such a process, a wet state fine powder of modified PTFE (hereinafter referred to also as a wet powder) is obtained.

Next, the wet powder is dried. By the drying condition, it is possible to control the extrusion pressure in the extrusion test. For example, the extrusion pressure may be varied by the drying temperature, the size of the drying oven, the amount of the wet powder to be dried at once, etc. It is preferred to set the drying conditions so that the extrusion pressure will be within the preferred range as described later. The drying temperature of the wet powder is preferably from 110 to 250° C., more preferably from 120 to 230° C. If the drying temperature is lower than 110° C., not only it takes time for drying, but drying may sometimes become insufficient. If the drying temperature exceeds 250° C., there may be a case where the paste extrusion pressure becomes significantly higher.

Drying of the wet powder is preferably carried out under an atmosphere containing ammonia. The atmosphere containing ammonia is meant for an atmosphere wherein ammonia gas is capable of being in contact with the fine powder of modified PTFE. For example, it is meant for an atmosphere wherein ammonia gas is present, or an atmosphere wherein the wet powder contains a compound to generate ammonia or ammonia gas, and ammonia gas will be generated e.g. by heating.

The compound to generate ammonia may, for example, be an ammonium salt, urea, etc., and such a compound will generate ammonia gas when decomposed by heating. As the compound to generate ammonia, in particular, ammonium carbonate is preferred.

When the wet powder is dried in an atmosphere containing ammonia, it will be easy to obtain a fine powder of modified PTFE which is excellent in breaking strength.

<Fine Powder of Modified PTFE>

The standard specific gravity (SSG) of the fine powder of modified PTFE is from 2.130 to 2.145. SSG is preferably from 2.135 to 2.142, more preferably from 2.135 to 2.138. SSG is useful as an index for a relative molecular weight, and the lower the value is, the higher the molecular weight is. Further, when the amount of a comonomer introduced is large, the non-crystalline structure will be further increased, the density tends to be low, and the value of SSG tends to be small.

Of the fine powder of modified PTFE, the extrusion pressure in the extrusion test is preferably from 19 to 25 MPa, more preferably from 19 to 22 MPa, further preferably from 19 to 21 MPa. When it is at least the lower limit value in the above range, the breaking strength of the stretched porous body readily tends to be sufficiently high, and when it is at most the upper limit value, it will be easy to conduct the stretching operation.

Further, the fluorinated anionic surfactant contained in an aqueous medium after separation of the fine powder of modified PTFE, is preferably recovered by using a method for adsorbing it by an ion exchange resin, a method for concentrating such as evaporating water, or adsorption on activated carbon. Further, the fluorinated anionic surfactant adsorbed on the wet powder, will be evaporated during drying, and therefore, it is preferred to recover the fluorinated anionic surfactant by introducing the air discharged during the drying into an alkaline aqueous solution.

<Production Method for Stretched Porous Body of Modified PTFE>

The production method for a stretched porous body of modified PTFE of the present invention has a step of subjecting the fine powder of modified PTFE as obtained above to paste extrusion to obtain an extruded bead, which is then formed into a sheet or tape via e.g. calendering, followed by stretching to obtain a stretched porous body of modified PTFE.

As the paste extrusion molding method, a known method may be employed. For example, a method of mixing the fine powder of modified PTFE and a lubricant to impart fluidity, followed by paste extrusion molding into a desired shape, may be mentioned. The mixing ratio of the lubricant is usually preferably from 15 to 30 parts by mass, more preferably from 20 to 25 parts by mass, of the lubricant, per 100 parts by mass of the fine powder of modified PTFE. As the lubricant, naphtha or a petroleum-based hydrocarbon having a dry point of at least 100, is preferred. Further, it is also possible to add additives such as pigments for coloring, various fillers for imparting strength and conductivity, etc.

The shape of the paste extrusion molded product of the fine powder of modified PTFE may be various including tubular, sheet, film, fibrous, etc. As its applications, tubes, wire coatings, sealing materials, porous membranes, filters, etc. may be mentioned.

By stretching the paste extrusion molded product of the fine powder of modified PTFE, it is possible to produce a stretched porous body of modified PTFE. As the stretching conditions, a suitable speed, e.g. a speed of from 5%/sec to 1,000%/sec, and a suitable stretching ratio, e.g. a stretching ratio of at least 500%, are employed. The porosity of the stretched porous body is not particularly limited, but usually the porosity is preferably in a range of from 50 to 99%, particularly preferably from 70 to 98%.

According to the present invention, it is possible to obtain a stretched porous body of modified PTFE excellent in breaking strength. The breaking strength of the stretched porous body of modified PTFE is preferably at least 36N, more preferably at least 36.5N, particularly preferably at least 37N. The upper limit is preferably at most 60N, more preferably at most 55N, particularly preferably at most 51N. As the breaking strength is higher, it is possible to take various means at the time of stretching processing.

The reason as to why it is possible to obtain a stretched porous body of modified PTFE excellent in breaking strength in the present invention, is not clear, but is considered to be as follows.

At the time of subjecting TFE and its comonomer to emulsion polymerization in the presence of a low bioaccumulative fluorinated anionic surfactant, by using a specific amount of PFAE having a high reactivity with TFE, as its comonomer, and letting such PFAE be present in the polymerization reaction system at initiation of the emulsion polymerization, the size of modified PTFE polymer particles to be produced by emulsion polymerization is likely to be uniform. Besides, by using a specific water-soluble redox initiator as the polymerization initiator, it is possible to control the radical generation from the polymerization initiator in the course of the polymerization reaction. As a result, after controlling the radical generation, living polymerization solely by radicals at modified PTFE polymer terminals will proceed, whereby the resulting modified PTFE tends to have a higher molecular weight. Accordingly, it is considered possible to form modified PTFE having a high molecular weight and a narrow molecular weight distribution. Particularly in the present invention, by using a specific water-soluble redox initiator, it is easy to control the radical generation from the initiator, whereby it is considered possible to obtain the above effects more satisfactorily. Further, it is considered that by introducing PFAE at initiation of the polymerization, the crystal structure of the resulting modified PTFE will not be too high, and the shape of modified PTFE particles is likely to take a stable spherical structure. Therefore, generation of atypical particles such as rod-shaped particles or coarse particles is considered to be suppressed. That is, modified PTFE particles having a high molecular weight and being excellent in uniformity of the size and shape will be formed, whereby it is considered possible to obtain a stretched porous body having a high breaking strength.

EXAMPLES

Hereinafter, the present invention will be described more specifically with reference to Examples and Comparative Examples, but the present invention should not be construed as being limited by these Examples.

<Measurement Methods>

[Average Primary Particle Diameter]

With respect to an aqueous emulsion obtained by emulsion polymerization, the average primary particle diameter of modified PTFE particles was measured by means of a laser scattering particle size distribution analyzer (manufactured by HORIBA, Ltd., trade name "LA-920") by a method for measuring the average particle diameter.

[Stability Test for Aqueous Emulsion (Measurement of Stability Retention Time)]

On the inner wall of a cylindrical container made of SUS304 and having an internal diameter of 12 cm, two plates of baffle (baffle plates) having a thickness of 2.9 mm, a width of 2.5 cm and a length of 15 cm were welded so as to be symmetrical with respect to the central axis of the cylindrical container. The distance from the bottom surface of the cylindrical container to the baffle bottom was set to be 2.5 cm.

Further, in the cylindrical container, a stirrer having two paddle blades attached to a shaft having an inner diameter of 8.0 mm, was provided. The sizes of the paddle blades were such that the thickness was 1.2 mm, the width was 1.3 cm, and the length was 9.7 cm, and the inclination angle of the paddle blades was 30° to the plane perpendicular to the axial direction of the shaft, and the distance from the bottom surface of the cylindrical container to the lower end of the paddle blades was set to be 5 mm.

An aqueous emulsion having its solid content concentration adjusted to 20 mass % was charged in an amount of 800 g in the cylindrical container, and the temperature was adjusted to be at 23±1° C. Then, the stirring blades were rotated under a condition of 500 rpm for stirring, whereby the time from the initiation of stirring until the aqueous emulsion was destroyed and modified PTFE particles in the aqueous emulsion were coagulated, was measured and adopted as the stability retention time (unit: seconds). The coagulation time point was judged by a change in the stirring sound and by visual confirmation of formation of the wet powder.

[Solid Content Concentration (Mass %)]

On an aluminum dish having its mass preliminarily measured, from 7 to 8 g of an aqueous emulsion of modified PTFE was weighed, and water was evaporated by heating at 120° C. for 2 hours. Then, the mass of the aluminum dish including the solid content remaining on the aluminum dish, was measured. By dividing the mass of the solid content by the mass of the aqueous emulsion used, the solid content concentration was calculated.

[Standard Specific Gravity (SSG) of Fine Powder of Modified PTFE]

SSG was measured in accordance with ASTM D4895-10. 12.0 g of a sample was weighed and held under 34.5 MPa for 2 minutes in a cylindrical mold having an inner diameter of 28.6 mm, to obtain a molded sample. This was put in an oven of 290° C., heated at 120° C./hr and held at 380° C. for 30 minutes, then cooled at 60° C./hr and held at 294° C. for 24 minutes. After keeping it for 12 hours in a desiccator of 23° C., the specific gravity value of the molded product to water at 23° C. was measured and adopted as SSG.

[Extrusion Pressure]

100 g of a fine powder of modified PTFE left to stand at room temperature for at least 2 hours, was put into a glass bottle having an internal capacity of 500 mL, and 21.7 g of a lubricating oil (Isopar H (registered trademark), manufactured by Exxon) was added, followed by mixing for 3 minutes to obtain a mixture. The obtained mixture was left to stand for 2 hours in a 25° C. thermostatic oven, and then, subjected to paste extrusion through an orifice having a diameter of 2.5 cm, a land length of 1.1 cm and an introduction angle of 30°, at 25° C., under conditions of a reduction ratio (ratio of the cross-sectional area of the inlet to the cross-sectional area of the outlet of the die) of 100, and an extrusion speed of 51 cm/min., to obtain an extruded bead (the string-like material). The pressure required for extrusion at that time was measured and adopted as the extrusion pressure (unit: MPa).

[Breaking Strength]

An extruded bead was obtained in the same manner as in the method for measuring the extrusion pressure, and this was dried at 230° C. for 30 minutes, to remove the lubricant. Then, the extruded bead was cut into a suitable length, and both ends were fixed so that the clamp interval would be 5.1 cm, followed by heating to 300° C. in a circulating air oven. Subsequently, it was stretched under conditions of a stretching rate of 100%/sec. and a stretching ratio of 2,400%, to obtain a stretched porous body of modified PTFE (hereinafter referred to as a stretched bead).

With respect to a total of three samples i.e. a sample obtainable from each end of the stretched bead (if there is any neck-down in the region of the clamp, excluding such a neck-portion) and a sample obtainable from the center of the stretched bead, the tensile breaking load forces were, respectively, measured by means of a tensile tester (manufactured by A & D Inc.), whereupon the minimum value was adopted as the breaking strength.

In the measurement by the tensile tester, a sample was fixed as sandwiched by movable jaws with a gauge length of 5.0 cm, and at room temperature (24° C.), the movable jaws were driven at a speed of 300 mm/min., to impart a tensile stress.

Examples and Comparative Examples

Ex. 1, 4 to 10 and 12 are Examples of the present invention, and Ex. 2, 3 and 11 are Comparative Examples. Further, the polymerization initiators used in the following Ex. are the following (A), (B) or (C).

(A) a combination of a bromate and a sulfite.
(B) a combination of a permanganate and oxalic acid.
(C) a combination of disuccinic acid peroxide and a sulfite.

Ex. 1

PFBE as PFAE, and the polymerization initiator (A) were used. By estimating the total amount of 21 kg of TFE to be added after initiating the polymerization reaction until completion of the polymerization reaction while maintaining a predetermined polymerization pressure, to be the final production amount of the modified PTFE, the amount of PFBE to be added, was set to be 6.3 g being 300 ppm thereto. Further, the amount of the fluorinated anionic surfactant to be added, was set to be 312 g being about 1.49 mass % to the final production amount of the modified PTFE.

Into a 100 L stainless steel autoclave equipped with baffle plates and a stirrer, 72 g of $C_2F_5OC_2F_4OCF_2COONH_4$ (ammonium perfluoro-3,6-dioxaoctanoate, LogPOW=3.1, hereinafter referred to as APFDO) as a fluorinated anionic surfactant, 928 g of paraffin wax as a stabilizing aid, 11.6 g of succinic acid, 0.4 g (0.04 mmol/L) of potassium bromate, 8 mL of 1N nitric acid, and 55 L of deionized water were charged. The autoclave was purged with nitrogen, then brought under a reduced pressure, charged with 6.3 g of PFBE, then pressurized to about 0.1 MPa with TFE, and heated to 65° C. with stirring. Then, it was pressurized to 1.52 MPa with TFE, and an ammonium sulfite aqueous solution at a concentration of 0.07 mass % was continuously added at 5 mL/min, to initiate a polymerization reaction. The polymerization was allowed to proceed while adding TFE in order to keep the internal pressure of the autoclave to be 1.52 MPa.

At the time when the amount of TFE added after initiation of the polymerization reached 6.3 kg, the addition of the ammonium sulfite aqueous solution was stopped, and 240 g of APFDO was additionally added. The total amount of the ammonium sulfite added, was 0.21 g (0.03 mmol/L). Further, the temperature was raised to 90° C. At the time when the amount of TFE added after initiation of the polymerization reached 21 kg, the polymerization reaction was terminated, and TFE in the autoclave was discharged to the atmosphere. The polymerization time was 182 minutes.

The obtained aqueous emulsion of modified PTFE was cooled, and the supernatant paraffin wax was removed. The solid content concentration in the obtained aqueous emulsion of modified PTFE was 26.5 mass %. The yield of modified PTFE was 20.6 kg. Further, coagulum in the autoclave was at a level of a trace.

The average primary particle diameter of modified PTFE particles in the obtained aqueous emulsion of modified PTFE, and the stability retention time of the aqueous emulsion of modified PTFE, were measured. The results are shown in Table 1.

This aqueous emulsion of modified PTFE was diluted to a concentration of 10 mass % with deionized water, and then adjusted to be 14° C., and ammonium carbonate was added, followed by stirring for coagulation to obtain a wet powder. Then, the wet powder was dried at 180° C. to obtain a fine powder of modified PTFE.

In accordance with the above-mentioned methods, SSG, the extrusion pressure and the breaking strength were measured. The results are shown in Table 1.

Ex. 2

An aqueous dispersion of PTFE was produced in the same manner as in Ex. 1 except that without addition of PFAE, the concentration of the ammonium sulfite aqueous solution was changed to 0.05 mass %, and the total amount of the ammonium sulfite added, was 0.14 g (0.02 mmol/L). The internal pressure of the autoclave during the polymerization reaction was maintained to be 1.37 MPa. The polymerization time was 194 minutes. The properties of the fine powder of modified PTFE and the stretched porous body of modified PTFE were measured in the same manner as in Ex. 1. The results are shown in Table 1.

Ex. 3

The polymerization initiator (B) was used. In the same autoclave as in Ex. 1, 50 g of APFDO, 928 g of paraffin wax, 20.0 g of succinic acid, 0.3 g (0.06 mmol/L) of oxalic acid and 59 L of deionized water were charged. The autoclave was purged with nitrogen and brought to reduced pressure, and 2.1 g of PFBE was charged. It was pressurized to about 0.1 MPa with TFE and heated to 65° C. with stirring. Then, it was pressurized to 1.62 MPa with TFE, and an aqueous potassium permanganate solution at a concentration of 0.04 mass % was continuously added at about 3 mL/min, to initiate a polymerization reaction. The polymerization was allowed to proceed while adding TFE in order to keep the internal pressure of the autoclave to be 1.62 MPa.

At the time when the amount of TFE added after initiation of the polymerization reached 7.2 kg, the addition of the aqueous potassium permanganate solution was stopped, and 200 g of APFDO was additionally added. The total amount of potassium permanganate added was 0.06 g (0.006 mmol/L). Further, the temperature was raised to 90° C. At the time when the amount of TFE added after initiation of the polymerization initiation reached 20.5 kg, the polymerization reaction was terminated, and TFE in the autoclave was discharged to the atmosphere. The polymerization time was 186 minutes.

Thereafter, in the same manner as in Ex. 1, an aqueous emulsion of modified PTFE, a fine powder of modified PTFE and a stretched porous body of modified PTFE were produced, and the same measurements were conducted. The results are shown in Table 1.

The solid content concentration of the obtained aqueous emulsion of modified PTFE was 25.2 mass %. The yield of modified PTFE was 20.5 kg. Further, coagulum in the autoclave was at a level of a trace.

Ex. 4

In the same manner as in Ex. 3 except that 2.7 g of PFBE was used, a fine powder of modified PTFE and a stretched porous body of modified PTFE were prepared, and the same measurements were conducted. The results are shown in Table 1. The solid content concentration in the obtained aqueous emulsion of modified PTFE was 25.5 mass %. The yield of modified PTFE was 20.8 kg. Further, coagulum in the autoclave was at a level of a trace.

Ex. 5

In the same manner as in Ex. 3 except that 3.2 g of PFBE was used, a fine powder of modified PTFE and a stretched porous body of modified PTFE were prepared, and the same measurements were conducted. The results are shown in Table 1. The solid content concentration in the obtained aqueous emulsion of modified PTFE was 24.9 mass %. The yield of modified PTFE was 20.2 kg. Further, coagulum in the autoclave was at a level of a trace.

Ex. 6

Polymerization was conducted in the same manner as in Ex. 1 except that 12.6 g of PFBE was used, the concentration of the ammonium sulfite aqueous solution was changed to 0.09 mass %, and the total amount of the ammonium sulfite added was 0.26 g (0.04 mmol/L). The internal pressure of the autoclave during the polymerization reaction was maintained to be 1.81 MPa. The polymerization time was 164 minutes. The properties of the fine powder of modified PTFE and the stretched porous body of modified PTFE were measured in the same manner as Ex. 1. The results are shown in Table 1.

Ex. 7

Polymerization was conducted in the same manner as in Ex. 1 except that 21 g of PFBE was used, the amount of potassium bromate added was changed to 0.6 g (0.07 mmol/L), the concentration of the ammonium sulfite aqueous solution was changed to 0.14 mass %, and the total amount of the ammonium sulfite added was 0.44 g (0.06 mmol/L). The internal pressure of the autoclave during the polymerization reaction was maintained to be 1.81 MPa. The polymerization time was 163 minutes. The properties of the fine powder of modified PTFE and the stretched porous body of modified PTFE were measured in the same manner as Ex. 1. The results are shown in Table 1.

Ex. 8 and 9

Ex. 8 and 9 are Examples wherein in Ex. 1, PFAE was changed to PFHE. Further, in the same manner as in Ex. 1 except that the production conditions were changed as described below, an aqueous emulsion of modified PTFE, a fine powder of modified PTFE and a stretched porous body of modified PTFE were produced, and the same measurements were conducted. The results are shown in Table 1.

In Ex. 8, 18.9 g of PFHE was charged, the amount of potassium bromate added was 0.6 g (0.07 mmol/L), the concentration of the ammonium sulfite aqueous solution was 0.14 mass %, and the total amount of the ammonium sulfite added was 0.34 g (0.05 mmol/L). The internal pressure of the autoclave during the polymerization reaction was maintained to be 1.81 MPa. The polymerization time was 353 minutes.

In Ex. 9, 42.0 g of PFHE was charged, the amount of potassium bromate added was 1.2 g (0.13 mmol/L), the concentration of the ammonium sulfite aqueous solution was 0.28 mass %, and the total amount of the ammonium sulfite added was 0.54 g (0.07 mmol/L). The internal pressure of the autoclave during the polymerization reaction was maintained to be 1.81 MPa, and at the time when the amount of TFE added reached 17.2 kg, the reaction was terminated. The polymerization time was 290 minutes. In Ex. 9, the amount (42.0 g) of PFHE added relative to the final production amount (17.2 kg) of the modified PTFE, was about 2,442 ppm.

Ex. 10

The polymerization initiator (B) was used. The final production amount of modified PTFE was set to be 23 kg, the amount of PFBE to be added was set to be 9.2 g, i.e. 400 ppm to the modified PTFE, and the total amount of a fluorinated anionic surfactant was set to be 250 g, i.e. about 1.09 mass % to the modified PTFE.

In the same autoclave as in Ex. 3, 50 g of APFDO, 928 g of paraffin wax, 11.55 g of succinic acid, 0.3 g (0.06 mmol/L) of oxalic acid and 59 L of deionized water were charged. The autoclave was flushed with nitrogen and then brought to reduced pressure, and 9.2 g of PFBE was charged.

It was pressurized to about 0.1 MPa with TFE and heated to 65° C. with stirring. Then, it was pressurized to 1.62 MPa with TFE, and an aqueous potassium permanganate solution at a concentration 0.04 mass % was continuously added at about 3 mL/min, to initiate a polymerization reaction. The polymerization was allowed to proceed while adding TFE in order to keep the internal pressure of the autoclave to be 1.62 MPa.

At the time when the amount of TFE added after initiation of the polymerization reached 9.2 kg, the addition of the aqueous potassium permanganate solution was stopped, and 200 g of APFDO was additionally added. The total amount of potassium permanganate added was 0.1 g (0.01 mmol/L). Further, the temperature was raised to 90° C. At the time when the amount of TFE added after initiation of the polymerization reached 23 kg, the polymerization reaction was terminated, and TFE in the autoclave was discharged to the atmosphere. The polymerization time was 210 minutes.

Subsequently, in the same manner as in Ex. 1, an aqueous emulsion of modified PTFE, a fine powder of modified PTFE and a stretched porous body of modified PTFE were produced, and the same measurements were conducted. The results are shown in Table 1.

The solid content concentration in the obtained aqueous emulsion of modified PTFE was about 27.0 mass %. The yield of modified PTFE was 22.5 kg. Further, coagulum in the autoclave was at a level of a trace.

Ex. 11

The polymerization initiator (C) was used. The final production amount of modified PTFE was set to be 27 kg, the amount of PFBE to be added was set to be 3.5 g, i.e. 130 ppm to the modified PTFE, and the total amount of fluorinated anionic surfactant was set to be 185 g, i.e. about 0.69 mass % to the modified PTFE.

In the same autoclave as in Ex. 1, 72 g of APFDO, 928 g of paraffin wax and 59 L of deionized water were charged. The autoclave was flushed with nitrogen, then brought to reduced pressure, charged with 5.4 g of PFBE, then pressurized to about 0.1 MPa with TFE and heated to 70° C. with stirring. Then, it was pressurized to 1.67 MPa with TFE, and 5.0 g of disuccinic acid peroxide (concentration: 80 mass %, rest being water) was dissolved in 1 liter of warm water at about 70° C. and injected, to initiate a polymerization reaction. The polymerization was allowed to proceed while adding TFE in order to keep the internal pressure of the autoclave to be 1.67 MPa.

During the polymerization, a solution having APFDO dissolved in warm water was added so that the total of APFDO would be 113 g. Further, by the time when the amount of TFE added after initiation of the polymerization reached 18.5 kg, a solution having ammonium sulfite dissolved in water was added so that the total of ammonium sulfite would be 3.85 g. The temperature was lowered to 65° C. at a middle stage and raised to 90° C. at a later stage of polymerization. At the time when the amount of TFE added after initiation of the polymerization reached 27 kg, the polymerization reaction was terminated, and TFE in the autoclave was discharged to the atmosphere. The polymerization time was 213 minutes.

The obtained aqueous emulsion of modified PTFE was cooled, and the supernatant paraffin wax was removed. The solid content concentration in the obtained aqueous emulsion of modified PTFE was 28.6 mass %. The yield of modified PTFE was 26.3 kg. Further, coagulum in the autoclave was at a level of a trace.

The average primary particle diameter of modified PTFE particles in the obtained aqueous emulsion of modified PTFE, and the stability retention time of the aqueous emulsion of modified PTFE were measured. The results are shown in Table 1.

This aqueous emulsion of modified PTFE was diluted to a concentration of 10 mass % with pure water, then adjusted to 20° C. and stirred for coagulation to obtain a wet powder. Then, the wet powder was dried at 200° C. to obtain a fine powder of modified PTFE.

Ex. 12

Using the aqueous emulsion of modified PTFE obtained in Ex. 4, without adding ammonium carbonate, stirring for coagulation was conducted in the same manner as in Ex. 1 to obtain a wet powder. An ammonium carbonate aqueous solution (20 mass % concentration) in an amount of 10 mass % to the fine powder of modified PTFE (dried amount) was preliminarily charged in a drying tray, and then a predetermined amount of the wet powder was put therein and dried at 190° C. to produce a fine powder of PTFE.

In the manner as described above, SSG, the extrusion pressure and the breaking strength were measured, and the results are shown in Table 1.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Polymerization initiator | (A) | (A) | (B) | (B) | (B) | (A) | (A) | (A) | (A) | (B) | (C) | (B) |
| Amount [ppm] of perfluoroalkyl ethylene  PFBE | 300 | — | 100 | 130 | 150 | 600 | 1000 | — | — | 400 | 130 | 130 |
| PFHE added | — | — | — | — | — | — | — | 900 | 2442 | — | — | — |
| Average primary particle diameter [μm] | 0.19 | 0.28 | 0.21 | 0.20 | 0.20 | 0.17 | 0.15 | 0.18 | 0.17 | 0.17 | 0.22 | 0.20 |
| Stability retention time [seconds] of aqueous emulsion | 715 | 149 | 304 | 343 | 355 | 1118 | 1679 | 636 | 968 | 550 | 291 | 343 |
| Standard specific gravity (SSG) | 2.138 | 2.148 | 2.139 | 2.138 | 2.138 | 2.138 | 2.138 | 2.138 | 2.138 | 2.136 | 2.139 | 2.138 |
| Extrusion pressure [MPa] in extrusion test | 20.7 | 20.2 | 19.4 | 19.6 | 20.6 | 20.6 | 20.7 | 21.0 | 21.0 | 19.5 | 19.9 | 20.4 |
| Breaking strength [N] | 44.3 | 35.1 | 35.5 | 36.6 | 37.4 | 46.2 | 47.0 | 50.8 | 46.6 | 41.6 | 30.6 | 41.0 |

As shown in Table 1, in Ex. 1 and 4 to 10 which are Examples of the present invention, it was possible to obtain a stretched porous body of modified PTFE excellent in breaking strength. In Ex. 12, by the same aqueous emulsion of modified PTFE as in Ex. 4, the breaking strength was further improved by drying under ammonia atmosphere.

Whereas, Ex. 2 wherein no PFAE was used, Ex. 3 wherein the amount of PFAE used was small and Ex. 11 wherein the polymerization initiator (C) was used, are Comparative Examples, wherein the breaking strength of the obtained stretched porous body of PTFE was poor.

Further, in each of Ex. 1 to 12, the stretched bead produced in the measurement of the breaking strength, was uniform without formation of rupture or voids.

INDUSTRIAL APPLICABILITY

From the aqueous emulsion or fine powder of modified polytetrafluoroethylene, obtainable in the present invention, it is possible to obtain a stretched porous body which is excellent particularly in breaking strength, and the stretched porous body is useful as a material for products in a wide range of fields including clothes, tents, precision filters, separation membranes, etc.

This application is a continuation of PCT Application No. PCT/JP2016/073776, filed on Aug. 12, 2016, which is based upon and claims the benefit of priority from Japanese Patent Application No. 2015-162239 filed on Aug. 19, 2015. The contents of those applications are incorporated herein by reference in their entireties.

What is claimed is:

1. A production method for an aqueous emulsion of modified polytetrafluoroethylene, which is a method to obtain an aqueous emulsion of non-melt-moldable modified polytetrafluoroethylene particles having an average primary particle diameter of from 0.10 to 0.30 μm, by subjecting tetrafluoroethylene and a perfluoroalkyl ethylene represented by the following formula (1) to emulsion polymerization in an aqueous medium, in a polymerization reactor using a polymerization initiator, in the presence of a fluorinated anionic surfactant having a LogPOW of from 2.4 to 3.4, wherein an amount of the perfluoroalkyl ethylene to be used, is from 120 to 3,000 ppm (by mass) to the final production amount of the modified polytetrafluoroethylene, the entire amount of the perfluoroalkyl ethylene is charged to the polymerizarion reactor such that at the initiation of the emulsion polymerization, the entire amount of the perfluoroalkyl ethylene is present, an amount of the fluorinated anionic surfactant present in the emulsion polymerization is from 1.09 to 2 mass % based on the final production amount of the modified polytetrafluoroethylene, and as the polymerization initiator, either one or both of a combination of a bromate and a bisulfite or sulfite, and a combination of a permanganate and oxalic acid, are used:

$$CH_2=CH-Rf \qquad (1)$$

wherein Rf is a $C_{1-6}$ perfluoroalkyl group.

2. The production method for an aqueous emulsion of modified polytetrafluoroethylene according to claim 1, wherein the fluorinated anionic surfactant is a fluorinated surfactant having 6 or 7 carbon atoms, 0 or 1 hydrogen atom, 0 or from 1 to 4 etheric oxygen atoms, a group represented by —COOA, wherein A is H, $NH_4$ or an alkali metal atom and the rest of atoms being fluorine atoms.

3. The production method for an aqueous emulsion of modified polytetrafluoroethylene according to claim 1, wherein the perfluoroalkyl ethylene is $CH_2=CH(CF_2)_2F$, $CH_2=CH(CF_2)_4F$ or $CH_2=CH(CF_2)_6F$.

4. The production method for an aqueous emulsion of modified polytetrafluoroethylene according to claim 3, wherein the perfluoroalkyl ethylene is $CH_2=CH(CF_2)_4F$ or $CH_2=CH(CF_2)_6F$.

5. A production method for a fine powder of modified polytetrafluoroethylene, which comprises producing an aqueous emulsion of modified polytetrafluoroethylene particles by the method as defined in claim 1, coagulating the obtained aqueous emulsion, and drying the obtained wet state fine powder of modified polytetrafluoroethylene, to obtain a powder having a standard specific gravity of from 2.130 to 2.145.

6. The production method for a fine powder of modified polytetrafluoroethylene according to claim 5, wherein the drying of the wet state fine powder of modified polytetrafluoroethylene is carried out in an atmosphere containing ammonia.

7. The production method for a fine powder of modified polytetrafluoroethylene according to claim 5, wherein the standard specific gravity is from 2.135 to 2.142.

8. The production method for a fine powder of modified polytetrafluoroethylene according to claim 5, wherein the extrusion pressure in the following extrusion test of the fine powder of modified polytetrafluoroethylene is from 19 to 25 MPa:

Extrusion test: 100 g of the fine powder of modified polytetrafluoroethylene left to stand for at least 2 hours at room temperature is put into a glass bottle having an internal capacity of 500 mL, and 21.7 g of a lubricating oil (Isopar H (registered trademark), manufactured by Exxon) is added and mixed for 3 minutes to obtain a mixture; and the obtained mixture is left to stand for 2 hours in a thermostat bath at 25° C. and then, subjected to paste extrusion through an orifice having a diameter of 2.5 cm, a land length of 1.1 cm and an introduction angle 30°, at 25° C. under conditions of a reduction ratio (ratio of the cross-sectional area of the inlet to the cross-sectional area of the outlet of a die) of 100 and an extrusion speed of 51 cm/min., to obtain an extruded bead, whereby the pressure required for the extrusion is measured, and the measured value is adopted as the extrusion pressure (unit: MPa).

9. A production method for a stretched porous body of modified polytetrafluoroethylene, which comprises producing a fine powder of modified polytetrafluoroethylene by the method as defined in claim 5, subjecting the obtained fine powder of modified polytetrafluoroethylene to paste extrusion to obtain an extruded bead, and stretching the extruded bead.

10. The production method for a stretched porous body of modified polytetrafluoroethylene according to claim 9, wherein the breaking strength of the stretched porous body of modified polytetrafluoroethylene is from 36 to 60N.

* * * * *